(12) United States Patent
Yen et al.

(10) Patent No.: US 9,007,529 B2
(45) Date of Patent: Apr. 14, 2015

(54) TV SIGNAL FILTER AND FILTERING METHOD

(71) Applicant: MStar Semiconductor, Inc., Hsinchu Hsien (TW)

(72) Inventors: Shih-Chieh Yen, Hsinchu Hsien (TW); Chao-Wei Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/315,773

(22) Filed: Jun. 26, 2014

(65) Prior Publication Data
US 2015/0002746 A1    Jan. 1, 2015

(30) Foreign Application Priority Data
Jun. 27, 2013    (TW) .............................. 102122971 A

(51) Int. Cl.
| | |
|---|---|
| H04N 5/21 | (2006.01) |
| H04N 5/44 | (2011.01) |
| H04N 5/50 | (2006.01) |
| H04N 5/455 | (2006.01) |

(52) U.S. Cl.
CPC . *H04N 5/21* (2013.01); *H04N 5/455* (2013.01)

(58) Field of Classification Search
USPC .......... 348/731, 725, 607; 455/131, 302, 296, 455/313–316, 323, 325, 338, 63.1; 725/151
See application file for complete search history.

(56) References Cited

U.S. PATENT DOCUMENTS

| | | | | |
|---|---|---|---|---|
| 4,520,507 | A * | 5/1985 | Moon ........................... | 725/151 |
| 5,548,839 | A * | 8/1996 | Caldwell et al. ............... | 455/313 |
| 6,522,367 | B1 * | 2/2003 | Ogino et al. ................... | 348/731 |
| 7,304,689 | B2 * | 12/2007 | Englmeier ..................... | 348/731 |
| 8,045,066 | B2 * | 10/2011 | Vorenkamp et al. ........... | 348/726 |
| 2004/0048574 | A1 * | 3/2004 | Walker et al. ................. | 455/63.1 |
| 2013/0300938 | A1 * | 11/2013 | Leme et al. .................... | 348/607 |

\* cited by examiner

*Primary Examiner* — Victor Kostak
(74) *Attorney, Agent, or Firm* — Edell, Shapiro & Finnan, LLC

(57) ABSTRACT

A filtering system includes a first filtering module, which includes a first frequency translating device and a first filter. The first frequency translating device includes a center frequency control end that receives a first control signal and an input end that receives an input signal, and performs a first frequency translation on the input signal by utilizing a first control frequency of the first control signal as a center frequency. The first filter performs a first filter on the input signal according to equivalent impedance of a circuit coupled to the input end, and generates in collaboration with the first frequency translating device a first filtered input signal at an output end of the filtering system. The equivalent impedance determines a bandwidth of the first filtered input signal.

22 Claims, 13 Drawing Sheets

US 9,007,529 B2

TV SIGNAL FILTER AND FILTERING METHOD

This application claims the benefit of Taiwan application Serial No. 102122971, filed Jun. 27, 2013, the subject matter of which is incorporated herein by reference.

BACKGROUND OF THE INVENTION

1. Field of the Invention

The invention relates in general to a filtering system, a filtering method, a TV signal receiver and a TV signal receiving method, and more particularly, to a filtering system, a filtering method, a TV signal receiver and a TV signal receiving method that filter signals in collaboration with frequency translation.

2. Description of the Related Art

A TV system down-converts one or multiple channels to obtain TV data. However, if an overall bandwidth of the system is too large or there are a large number of channels, it is possible that channels having harmonic frequencies be also down-converted. For example, when down-converting a 100 MHz channel, channels in corresponding odd harmonic frequencies (e.g., 300 MHz or 500 MHz) may also be down-converted. Signals of these channels may become superimposed to affect the accuracy of desired data of the channels.

As the frequency range covered by TV signals is vast, e.g., from 40 MHz to 1000 MHz, a considerable number of channels are covered. Individual signal strengths of these channels are different, and so a front-end circuit is required to have a remarkably large dynamic range in order to handle all of the channels. As a result, linearity of the front-end circuit may be attenuated. Further, to obtain TV data of multiple channels, multiple tuners may be connected in series into a loop in certain TV systems. Under such architecture, signal loss may rise due to the loop, in a way that power consumption as well as costs are increased.

SUMMARY OF THE INVENTION

It is an object of the present invention to provide a filtering system and a filtering method that filter different types of signals using a simple filter structure.

It is another object of the present invention to provide a TV signal receiver and a TV signal receiving method that filter different types of signals using a simple filter structure to solve the above issues.

A filtering system is disclosed according to an embodiment of the present invention. The filtering system includes a first filtering module, which includes a first frequency translating device and a first filter. The first frequency translating device includes a center frequency control end that receives a first control signal and an input end that receives an input signal, and performs a first frequency translation on the input signal by utilizing a first control frequency of the first control signal as a center frequency. The first filter performs a first filter on the input signal according to equivalent impedance of a circuit coupled to the input end, and generates in collaboration with the first frequency translating device a first filtered input signal at an output end of the filter system. The equivalent impedance determines a bandwidth of the first filtered input signal.

A TV signal receiver is further disclosed according to an embodiment of the present invention. The TV signal receiver includes a filtering system including a first filtering module, an analog-to-digital converter (ADC) and a digital front-end processor. The first filtering module includes: a first frequency translating device, including a center frequency control end that receives a first control signal and an input end that receives an input signal, configured to perform a first frequency translation on the input signal by utilizing a first control frequency of the first control signal as a center frequency; and a first filter, configured to perform a first filtering on the input signal according to equivalent impedance of a circuit coupled to the input end, and to generate in collaboration with the first frequency translating device a first filtered input signal at an output end of the filter system. The equivalent impedance determines a bandwidth of the first filtered input signal. The ADC performs digitalizes the first filtered TV signal to generate a digital filtered TV signal. The digital front-end processor processes the digital filtered TV signal.

According to the above embodiments, a signal can be filtered through a simple filter combination, so as to filter a TV signal before the TV signal enters an analog-to-digital processor to reduce a burden of the analog-to-digital processor.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
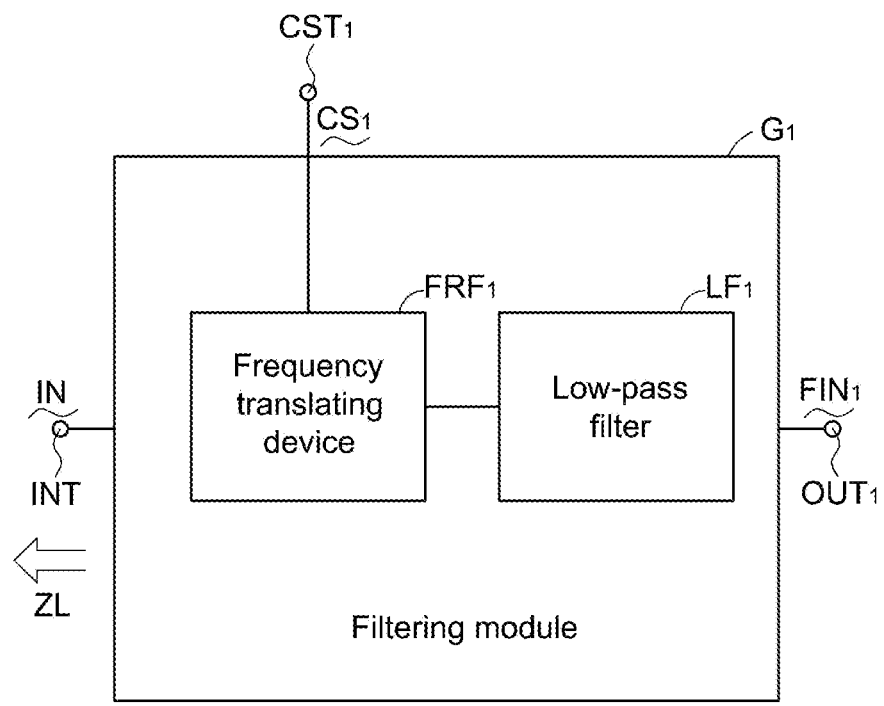
FIG. 1A is a block diagram of a filtering module according to an embodiment of the present invention.

FIG. 1A shows a block diagram of a filtering module $G_1$ according to an embodiment of the present invention. As shown in FIG. 1A, the filtering module $G_1$ includes a frequency translating device $FRF_1$ and a low-pass filter $LF_1$. The frequency translating device $FRF_1$ includes a center frequency control end $CST_1$ configured to receive a control signal $CS_1$, and an input end INT configured to receive an input signal IN; and frequency translates the input signal IN by utilizing a control frequency $CF_1$ of the control signal $CS_1$ as the center frequency. The low-pass filter $LF_1$ low-pass filters the input signal IN according to equivalent impedance $Z_L$ of a circuit coupled to the input end INT, and generates a filtered input signal $FIN_1$ at an output end $Out_1$ of the filtering module $G_1$ in collaboration with the frequency translating device $FRF_1$. It should be noted that, the low-pass filter $LF_1$ may be replaced by other types of filters such as a high-pass filter. Depending on structural differences of the frequency translating device $FRF_1$ and the low-pass filter $LF_1$, the filtered input signal $FIN_1$ may be inputted from the frequency translating device $FRF_1$ or from the low-pass filter $LF_1$. When the filtering module $G_1$ is a single-port device, the input end INT and the output end $Out_1$ may be the same end point.

Figure 1B:
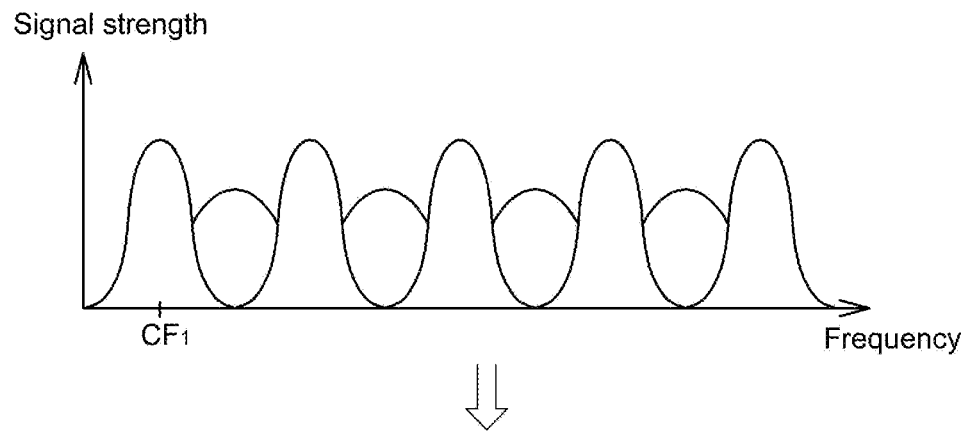
FIG. 1B is a schematic diagram of operations of the filtering module in FIG. 1A.
Figure 1B:
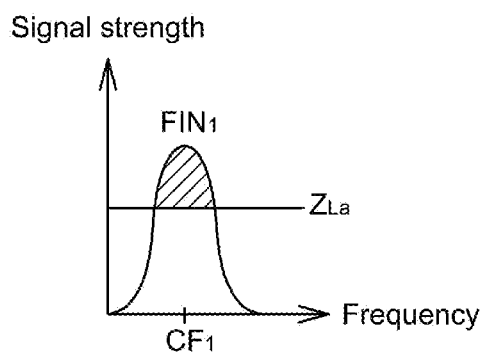
Figure 1B:
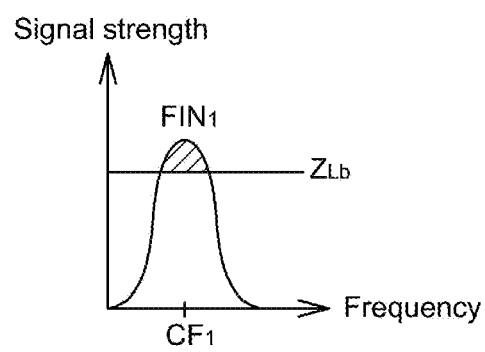

FIG. 1B shows a schematic diagram of operations of the filtering module in FIG. 1A. As shown in FIG. 1B, the frequency translating device $FRF_1$ frequency translates the input signal IN by utilizing the control frequency $CF_1$ as the center frequency. Further, the low-pass filter $LF_1$ low-pass filters the input signal IN according to the equivalent impedance $Z_L$ of the circuit coupled to the input end INT, so that a part of the signal is filtered out, as shown by the slanted parts in FIG. 1B. Parts of the signal filtered out may be different when values of the equivalent impedance $Z_L$ are different. Taking FIG. 1B for example, the value of $Z_{Lb}$ is greater than the value of $Z_{La}$, meaning that the part removed by the low-pass filtering according to $Z_{La}$ is greater than that removed by the low-pass filtering according to $Z_{Lb}$. In other words, the value of the equivalent impedance $Z_L$ determines the bandwidth of the filtered input signal $FIN_1$. It should be noted that, the foregoing frequency translation and filtering are non-sequentially correlated, and may be concurrently performed. Given the filtered signal as shown in FIG. 1B is obtained from frequency translating and low-pass filtering performed by a filtering module, associated modifications are encompassed within the scope of the present invention.

Figure 2A:
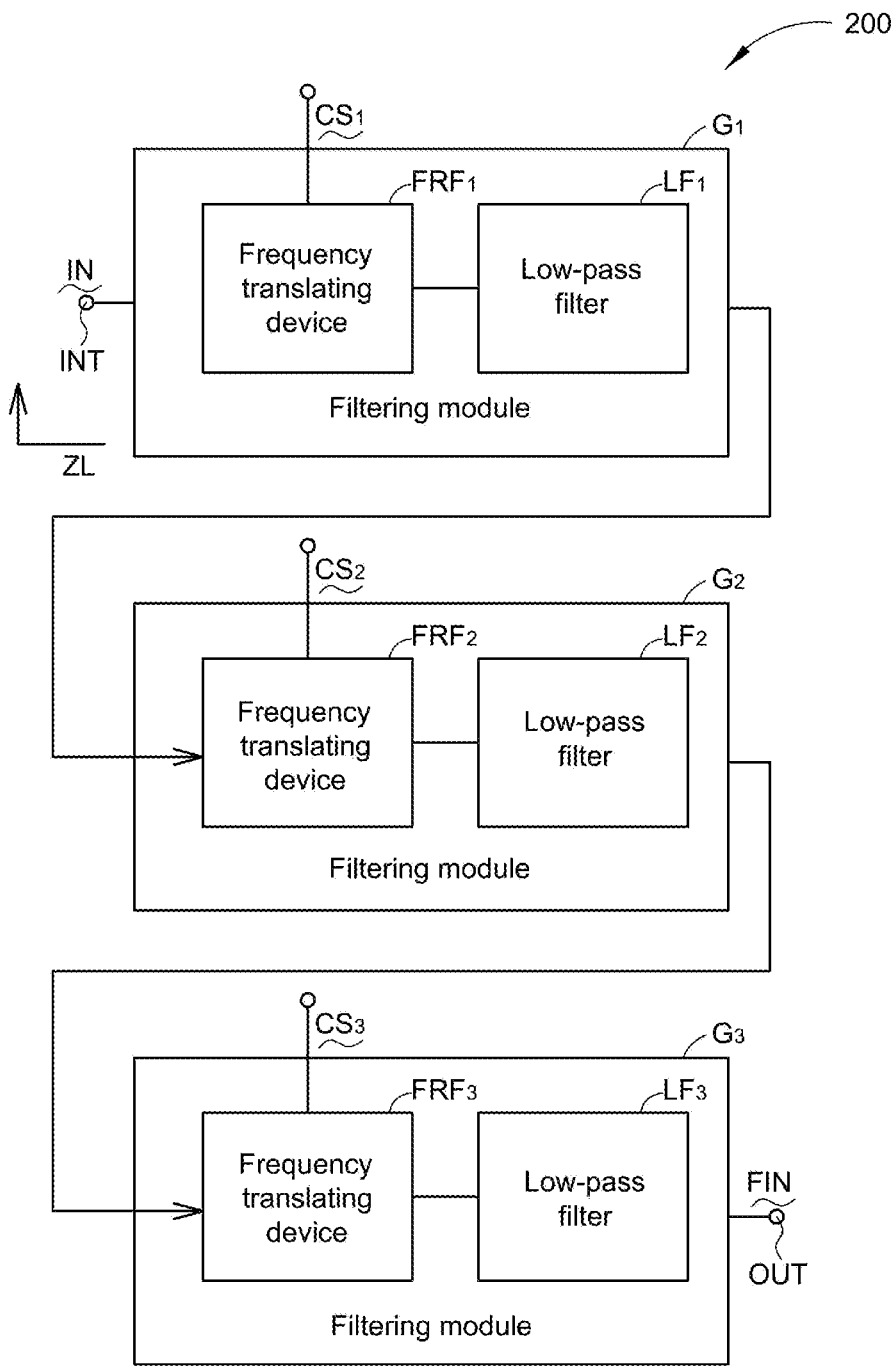
FIG. 2A is a block diagram of filtering modules connected in series according to an embodiment of the present invention.

FIG. 2A shows a block diagram of filtering modules connected in series according to an embodiment of the present invention. As shown in FIG. 2A, in addition to the filtering module $G_1$ shown in FIG. 1, a filtering system 200 further includes filtering modules $G_2$ and $G_3$. The filtering modules $G_2$ and $G_3$ respectively include frequency translating devices $FRF_2$ and $FRF_3$ and low-pass filters $LF_2$ and $LF_3$. The filtering modules $G_1$, $G_2$ and $G_3$ operate simultaneously to generate a filtered input signal FIN, and output the filtered input signal FIN at an output end Out of the filtering system 200. It should be noted that, the number of filtering modules may be other than three shown in FIG. 2A. In an alternative embodiment, the filtering system 200 is a single-port device; thus, the filtering modules $G_1$, $G_2$ and $G_3$ operate simultaneously to generate the filtered input signal FIN. In stead of a single-port device as the filtering system 200, any filtering system having an architecture formed by filtering devices that are connected in series and simultaneously operable is encompassed within the scope of the present invention.

Figure 2B:
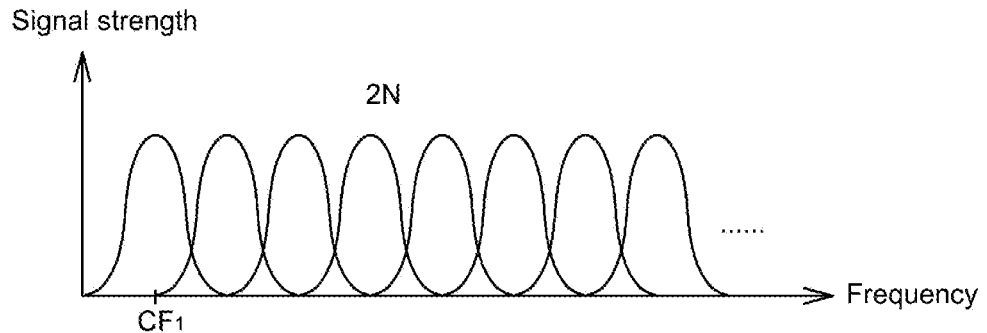
FIG. 2B is a schematic diagram of operations of the circuit in FIG. 2A.
Figure 2B:
Figure 2B:
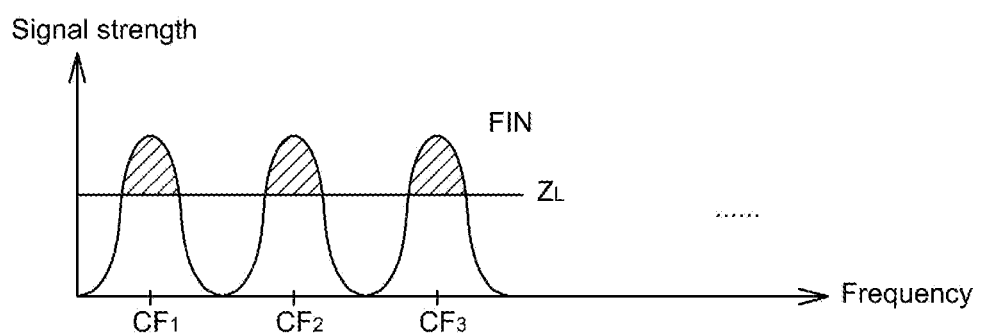

FIG. 2B shows a schematic diagram of operations of the circuit shown in FIG. 2A. As shown in FIG. 2B, in addition to the required TV data, the original input signal IN includes various kinds of unnecessary information. After undergoing the collaborative process of the filtering modules $G_1$, $G_2$ and $G_3$, signals of specified channels are preserved in the filtered input signal FIN. That is, the signals of channels having $CF_1$, $CF_2$ and $CF_3$ as center frequencies are preserved in the filtered input signal FIN. Further, the equivalent impedance $Z_L$ also determines signals of which parts are to be filtered out (the slanted parts in FIG. 2B).

Figure 3A:
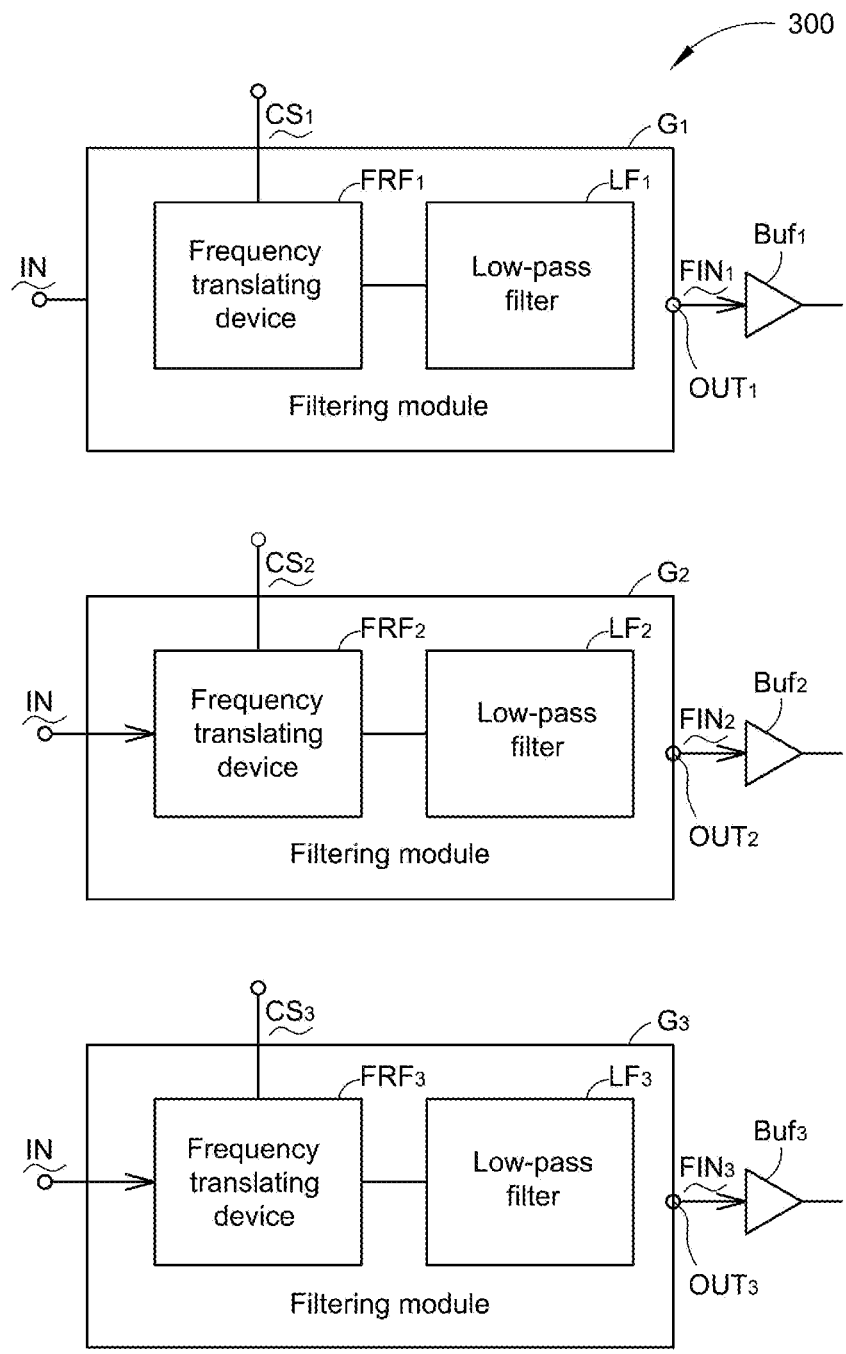
FIG. 3A is a block diagram of filtering modules connected in parallel according to an embodiment of the present invention.

FIG. 3A shows a block diagram of filtering modules connected in parallel according to an embodiment of the present invention. As shown in FIG. 3A, in addition to the filtering module $G_1$ shown in FIG. 1, a filtering system 300 further includes filtering modules $G_2$ and $G_3$. Different from FIG. 2A, each of the filtering modules in FIG. 3A is independent. Thus, signals inputted into each frequency translating device are all input signal IN, only that different frequency translating devices $FRF_1$, $FRF_2$ and $FRF_3$ perform frequency translations according to different controls signals $CS_1$, $CS_2$ and $CS_3$. With such structure, the filtering modules $G_1$, $G_2$ and $G_3$ output corresponding filtered input signals $FIN_1$, $FIN_2$ and $FIN_3$, respectively. In one embodiment, the filtering system 300 further includes buffers $Buf_1$, $Buf_2$ and $Buf_3$, which are located at output ends $Out_1$, $Out_2$ and $Out_3$ of the filtering modules $G_1$, $G_2$ and $G_3$, respectively. The filtering modules may be separated through the buffers $Buf_1$, $Buf_2$ and $Buf_3$ to prevent the impedances from interfering one another. It should be noted that, the number of frequency translating devices and low-pass filters may be other than three shown in FIG. 3A.

Figure 3B:
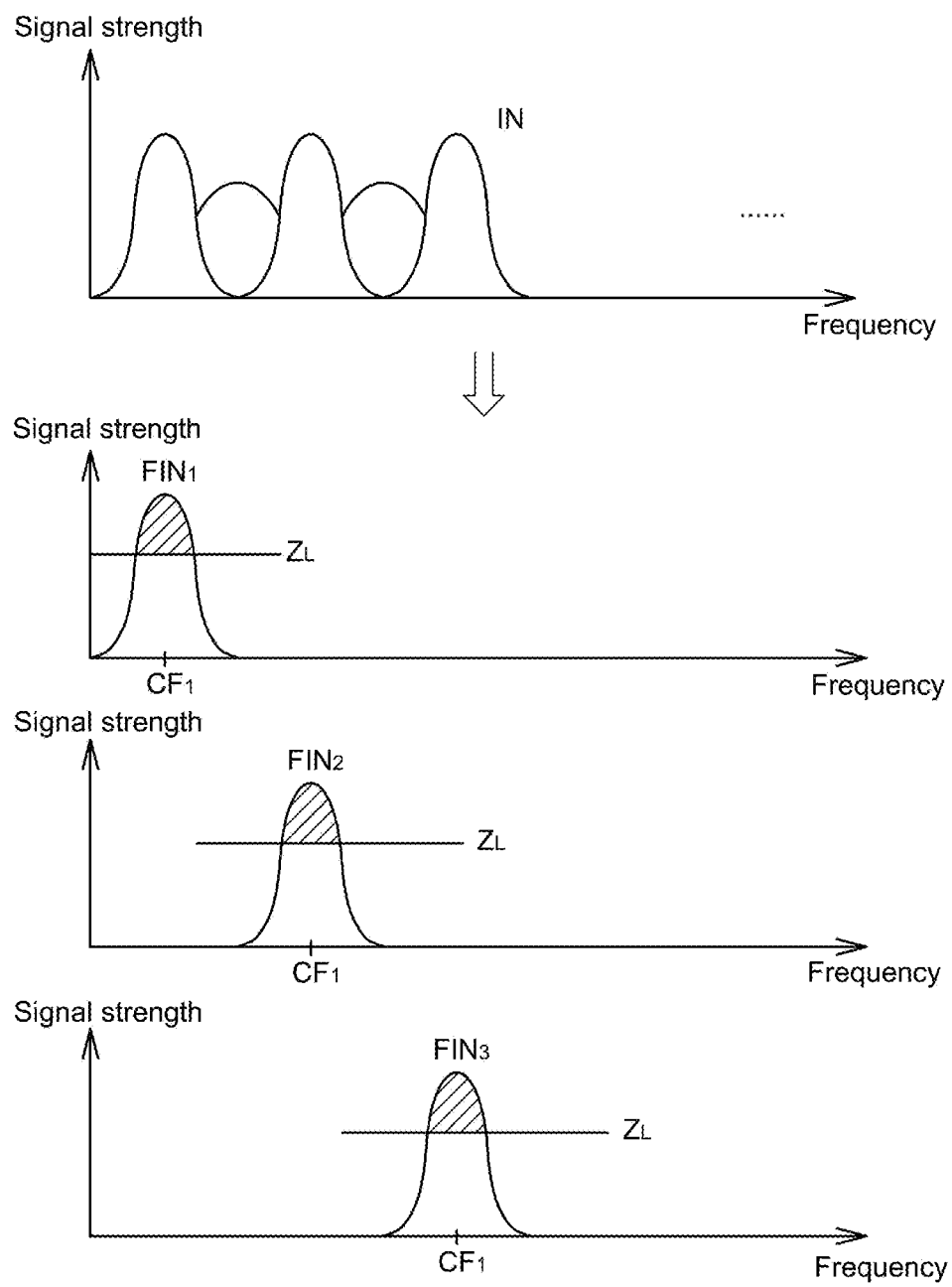
FIG. 3B is a schematic diagram of operations of the circuit in FIG. 3A.

FIG. 3B shows a schematic diagram of operations of the circuit shown in FIG. 3A. As shown in FIG. 3B, the input signal IN contains signals of various channels and other noises. After undergoing the process by the circuit shown in FIG. 3A, filtered input signals $FIN_1$, $FIN_2$ and $FIN_3$ are generated at the output ends $Out_1$, $Out_2$ and $Out_3$ of the filtering modules $G_1$, $G_2$ and $G_3$, respectively. Details of generating the filtered signals $FIN_1$, $FIN_2$ and $FIN_3$ and contents of those signals are as previously described, and shall be omitted herein.

Figure 4:
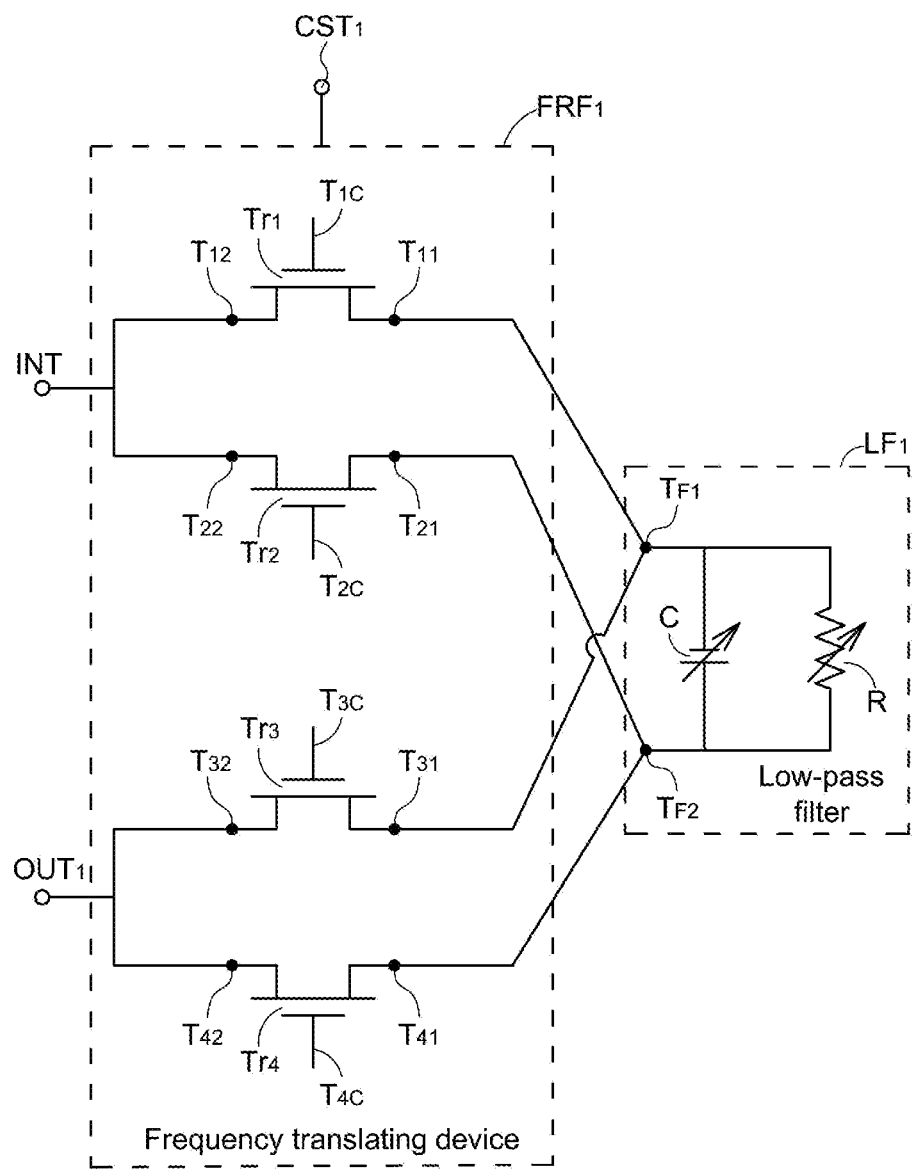
FIG. 4 is a detailed circuit diagram of a filtering module according to an embodiment of the present invention.

FIG. 4 shows a detailed schematic diagram of a filtering module according to an embodiment of the present invention. Referring to both FIG. 1 and FIG. 4, the low-pass filter $LF_1$ may include, but not limited to, a variable resistor R and a variable capacitor C, and a first end $TF_1$ and a second end $TF_2$. The frequency translating device $FRF_1$ includes a first switch element $Tr_1$, a second switch element $Tr_2$, a third switch element $Tr_3$ and a fourth switch element $Tr_4$. The first switch element $Tr_1$ includes a first end $T_{11}$ coupled to a first end $T_{F1}$ of the low-pass filter $LF_1$, a switch control end $T_{1C}$ coupled to the center frequency control end $CST_1$, and a second end $T_{12}$ coupled to the input end INT. The second switch element $Tr_2$ includes a first end $T_{21}$ coupled to a second end $T_{F2}$ of the low-pass filter $LF_1$, a switch control end $T_{2C}$ coupled to the center frequency control end $CST_1$, and a second end $T_{22}$ coupled to the input end INT. The third switch element $T_{r3}$ includes a first end $T_{31}$ coupled to the first end $T_{F1}$ of the low-pass filter $LF_1$, a switch control end $T_{3C}$ coupled to the center frequency control end $CST_1$, and a second end $T_{32}$ coupled to the output end $Out_1$. The fourth switch element $T_{r4}$ includes a first end $T_{41}$ coupled to a second end $TF_2$ of the low-pass filter $LF_1$, a switch control end $T_{4C}$ coupled to the center frequency control end $CST_1$, and a second end $T_{42}$ coupled to the output end $Out_1$.

Figure 5:
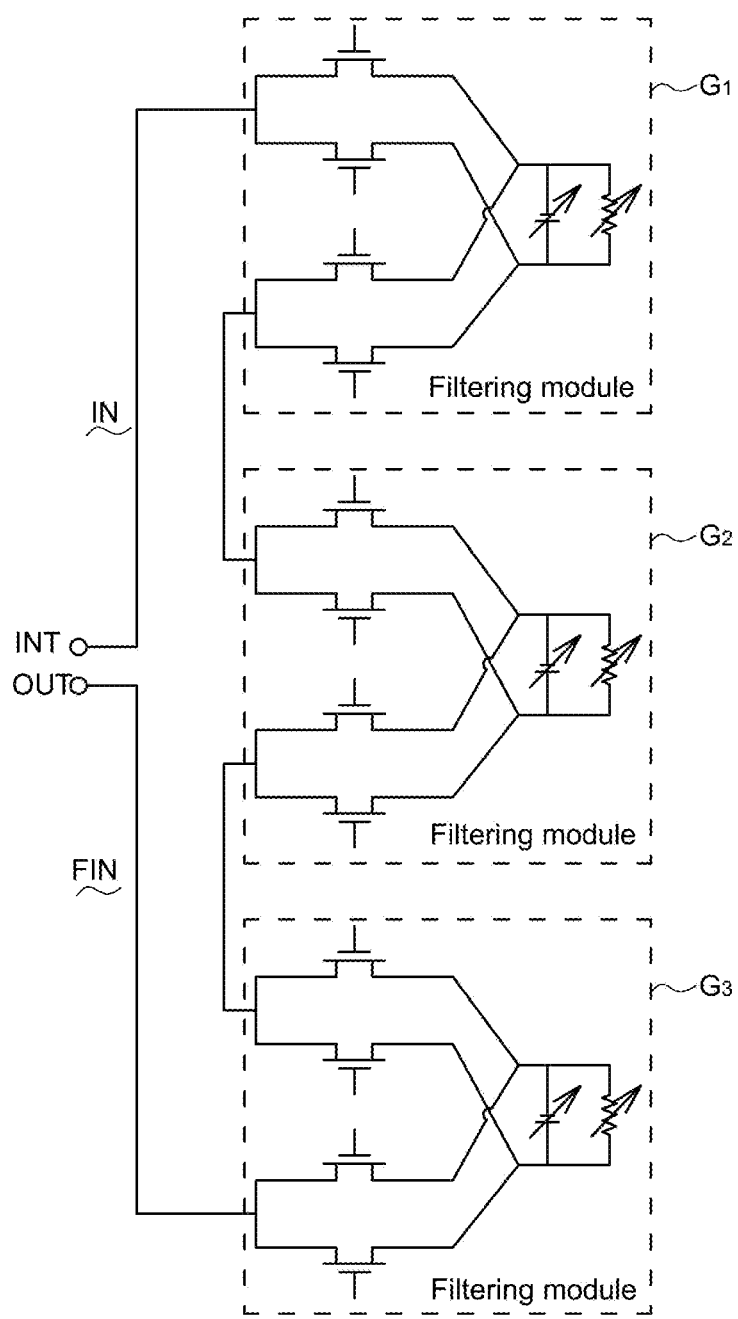
FIG. 5 is a schematic diagram of the circuit structure in FIG. 4 applied to the circuit in FIG. 2A.

FIG. 5 shows a schematic diagram of the circuit architecture in FIG. 4 applied to the circuit in FIG. 2A. As shown in FIG. 5, after passing the filtering module $G_1$, the input signal IN is collaboratively processed by the filtering modules $G_1$, $G_2$ and $G_3$ to form the filtered input signal FIN. Details and operations of FIG. 5 are as previously given in association with FIGS. 2 and 4, and shall be omitted herein.

Figure 6:
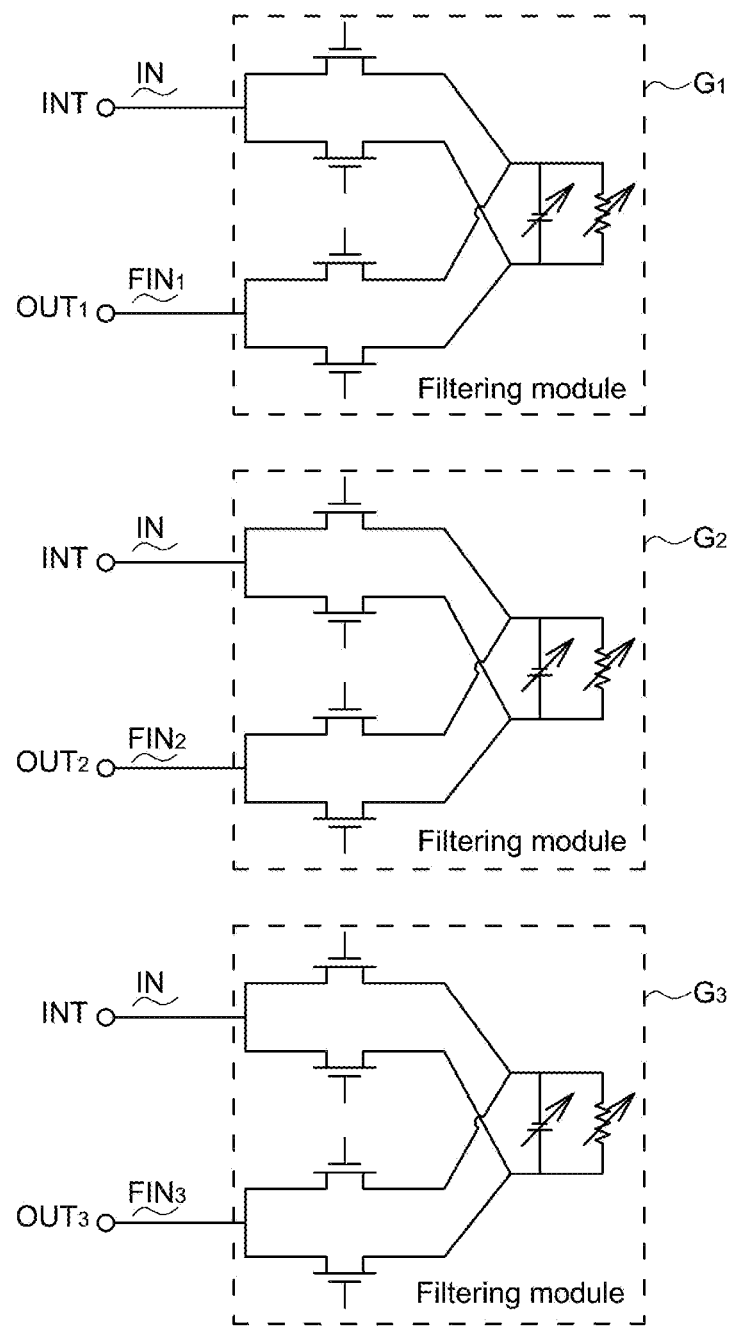
FIG. 6 is a schematic diagram of the circuit structure in FIG. 4 applied to the circuit in FIG. 3A.

FIG. 6 shows a schematic diagram of the circuit architecture in FIG. 4 applied to the circuit in FIG. 3A. As shown in FIG. 6, after being inputted into the filtering modules $G_1$, $G_2$ and $G_3$, the input signal IN is processed by the filtering modules $G_1$, $G_2$ and $G_3$ to sequentially form the filtered input signals $FIN_1$, $FIN_2$ an $FIN_3$, which are then respectively outputted at the output ends $Out_1$, $Out_2$ and $Out_3$. Details and operations of FIG. 6 are as previously given in association with FIGS. 3A and 4, and shall be omitted herein.

Figure 7:
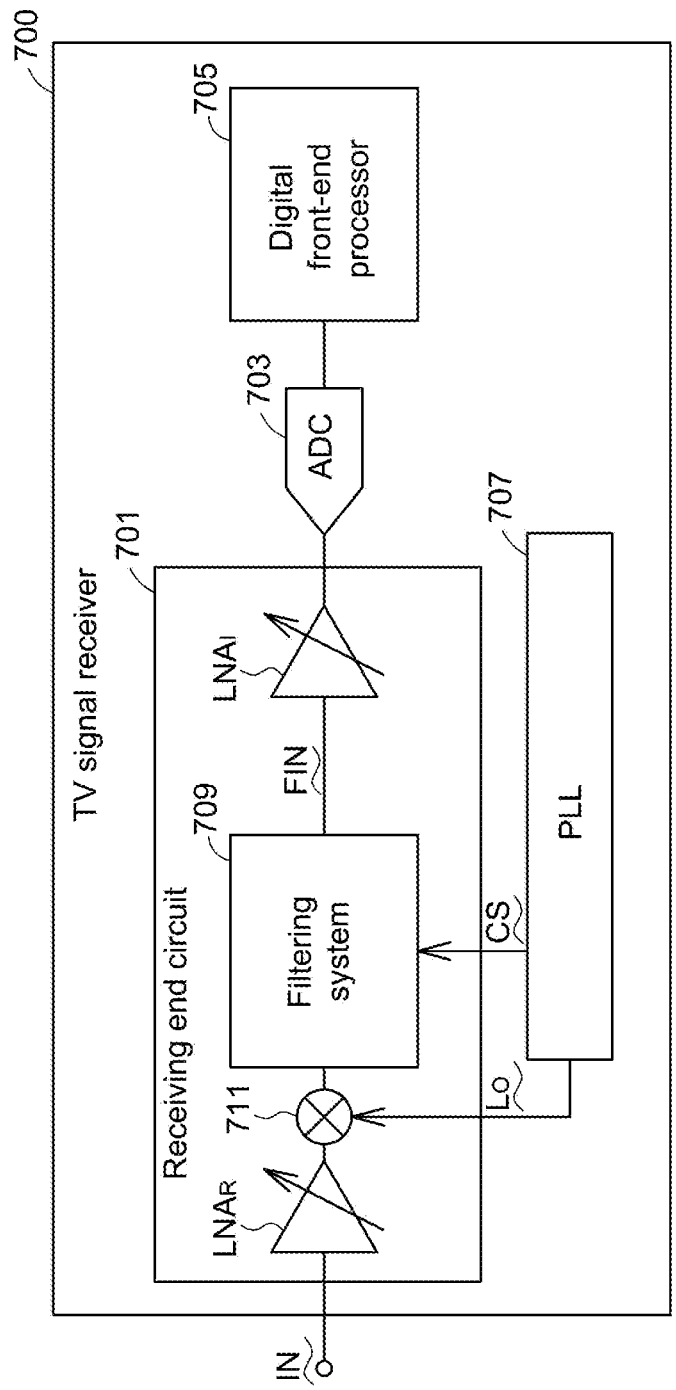
FIG. 7 is a schematic diagram of the structure in FIG. 2A applied to a TV signal receiver.

FIG. 7 shows a schematic diagram of the structure in FIG. 2A applied to a TV signal receiver 700. As shown in FIG. 7, the TV signal receiver 700 includes a receiving end circuit 701, an analog-to-digital converter (ADC) 703, a digital front-end processor 705, and a phase-locked loop (PLL) 707. The input signal IN is a TV signal. According to an embodiment of the present invention, a filtering system 709 is located in the receiving end circuit 701. The receiving end circuit 701 includes a radio frequency (RF) amplifier $LNA_R$, a mixer 711 and an intermediate frequency (IF) amplifier $LNA_I$. The mixer 711 receives a local oscillation signal LO from the PLL 707 (may be regarded as a local oscillator) and converts the received input signal IN from RF to IF. The filtering system 709 in a serial structure then processes the IF signal IN and outputs a filtered input signal FIN. The filtered input signal FIN is amplified by the IF amplifier $LNA_I$ and then forwarded to and processed by the ADC 703. The digitalized signal is outputted to the digital front-end processor 705. In one embodiment, the control signal CS received by the filtering system 709 is the local oscillation signal LO. It should be noted that, the TV signal receiver 700 may exclude the mixer 711, such that the input signal IN is amplified by the RF amplifier $LNA_R$ and then enters the filtering system 700 instead of being converted to IF.

Figure 8:
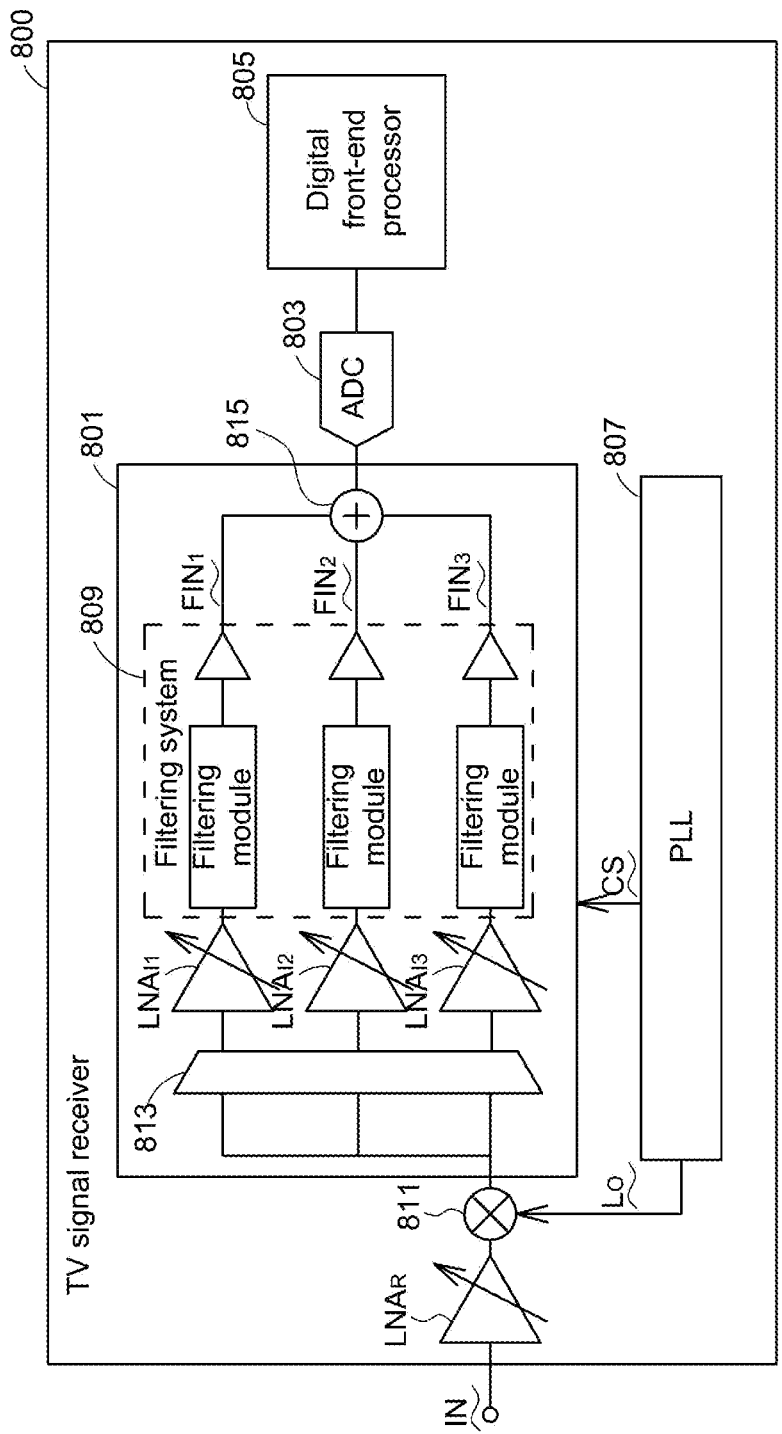
FIG. 8 is a schematic diagram of the structure in FIG. 3A applied to a TV signal receiver.

FIG. 8 shows a schematic diagram of the structure in FIG. 3A applied to a TV signal receiver. Similar to the structure in FIG. 7, a TV signal receiver 800 in FIG. 8 includes a receiving end circuit 801, an ADC 803, a digital front-end processor 805 and a PLL 807. A filtering system 809 according to an embodiment of the present invention is located in the receiving end circuit 801. A difference of FIG. 7 from FIG. 8 is that, the filtering modules in the filtering system 809 are connected in a parallel arrangement, and are located subsequent to IF amplifiers $LNA_{I1}$, $LNA_{I2}$ and $LNA_{I3}$. The filtered input signals $FIN_1$, $FIN_2$ and $FIN_3$ are summed up by an adder 815 to generate a summed filtered TV signal that is forwarded to the ADC 803. The digitalized signal is outputted to the digital front-end processor 805. In the embodiments in FIGS. 7 and 8, through the method of preliminarily filtering the input signal before the input signal enters the ADC, burdens of the ADCs 703 and 803 may be alleviated. Further, such method does not require high-precision ADCs and thus reduces circuit costs. It should be noted that, the TV signal receiver 800 may exclude the mixer 811, so that the input signal IN is amplified by the RF amplifier $LNA_R$ and then enters the filtering system 700 without being converted to IF.

The components and arrangements in FIGS. 7 and 8 are for illustrating the exemplary embodiments, not limiting the present invention. For example, the filtering systems in FIGS. 7 and 8 are located subsequent to the RF amplifier $LNA_R$, the IF amplifiers $LNA_{I1}$, $LNA_{I2}$ and $LNA_{I3}$, and the mixers 711 and 811, and may however be arranged subsequent to the RF amplifier $LNA_R$ and the IF amplifiers $LNA_{I1}$, $LNA_{I2}$ and $LNA_{I3}$ but preceding the mixers.

Figure 9:
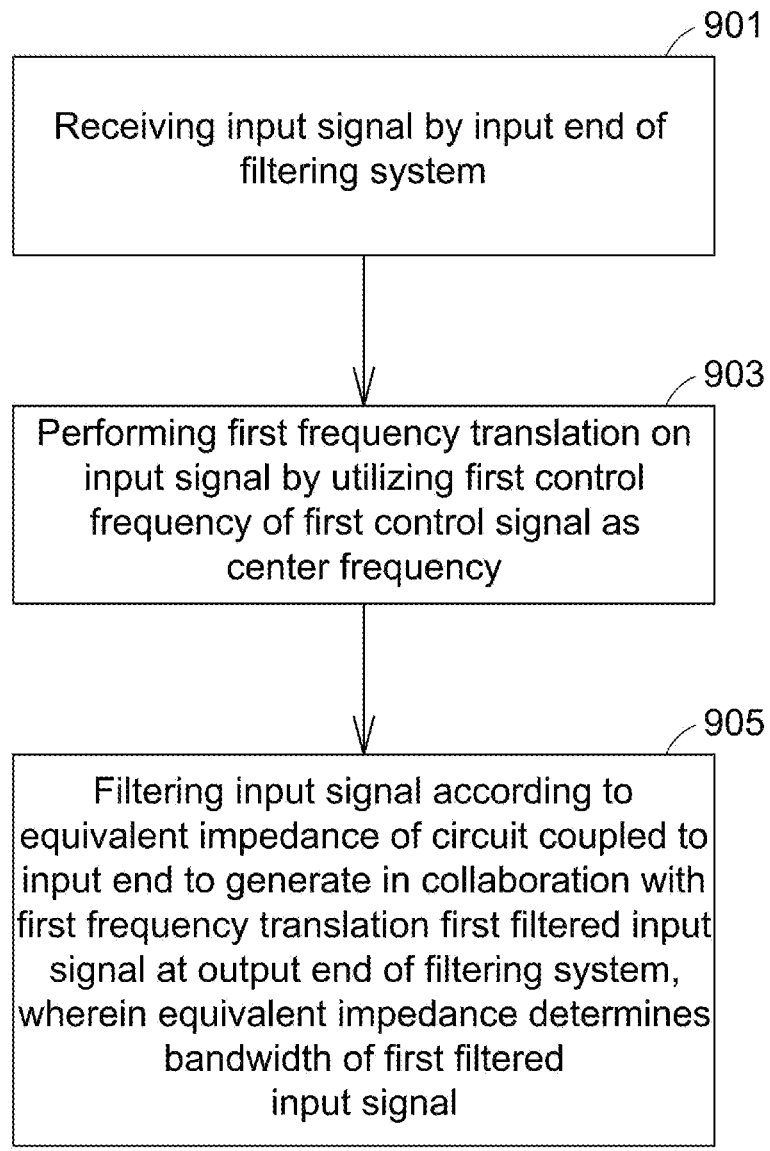
FIG. 9 is a flowchart of a filtering method according to an embodiment of the present invention.

FIG. 9 shows a flowchart of a filtering method according to an embodiment of the present invention. The filtering method includes the following steps.

In step 901, an input signal (e.g., the input signal IN in FIG. 1) is received by an input end of a filtering system.

In step 903, a first frequency translation is performed on the input signal by utilizing a first control frequency of a first control signal (e.g., the control signal $CS_1$ in FIG. 1A) as a center frequency.

In step 905, the input signal is filtered according to equivalent impedance of a circuit coupled to the input end to generate in collaboration with the first frequency translation a first filtered input signal at an output end of the filtering system. The equivalent impedance determines a bandwidth (e.g., $FIN_1$ in FIG. 1B) of the first filtered input signal.

Figure 10:
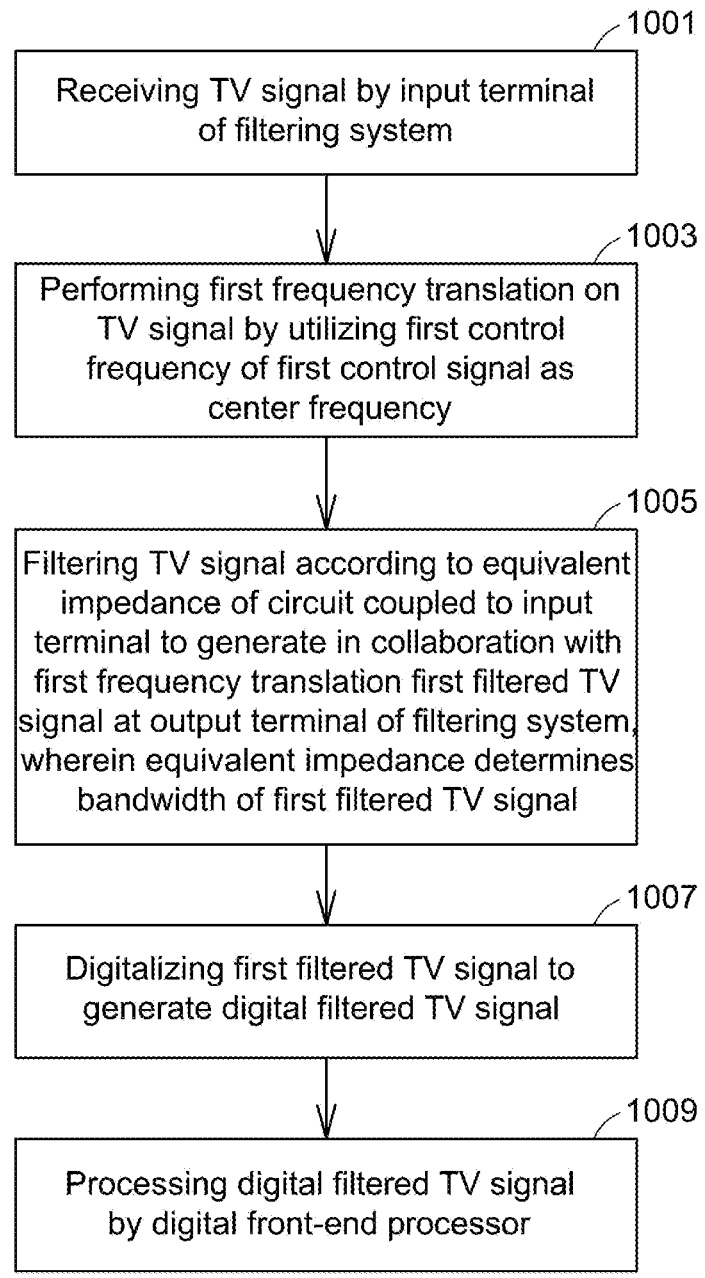
FIG. 10 is a flowchart of a TV signal receiving method according to an embodiment of the present invention.

FIG. 10 shows a flowchart of a TV signal receiving method according to an embodiment of the present invention. The TV signal receiving method corresponds to FIGS. 7 and 8, and includes the following steps.

In step 1001, a TV signal (e.g., the input signal IN in FIGS. 7 and 8) is received by an input end of the filtering system.

In step 1003, a first frequency translation is performed on the TV signal by utilizing a first control frequency of a first control signal (e.g., the control signal $CS_1$ in FIGS. 7 and 8) as a center frequency.

In step 1005, the TV signal is filtered according to equivalent impedance of a circuit coupled to the input end to generate in collaboration with the first frequency translation a first filtered TV signal at an output end of the filtering system. The equivalent impedance determines a bandwidth of the first filtered TV signal.

In step 1007, the first filtered TV signal is digitalized to generate a digital filtered TV signal.

In step 1009, processing the digitalized filtered TV signal (e.g., 705 and 805 in FIGS. 7 and 8) by a digital front-end processor.

According to the foregoing embodiments, a signal may be filtered by a simple filter combination, so as to filter a TV signal before the TV signal enters an analog-to-digital processor and thus reduce a burden of the analog-to-digital processor.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A filtering system, comprising:
    an output end; and
    a first filtering module, comprising:
        a first frequency translating device, comprising a center frequency control end and an input end, the center frequency control end configured to receive a first control signal, the input end configured to receive an input signal and being coupled to a circuit having equivalent impedance, the first frequency translating device configured to perform a first frequency translation on the input signal by utilizing a first control frequency of the first control signal as a center frequency; and
        a first filter, configured to perform a first filtering on the input signal according to the equivalent impedance, and to generate in collaboration with the first frequency translating device a first filtered input signal at the output end of the filtering system, wherein the equivalent impedance determines a bandwidth of the first filtered input signal.

2. The filtering system according to claim 1, wherein the first filter is a high-pass filter or a low-pass filter.

3. The filtering system according to claim 1, wherein the first frequency translating device comprises:
    a first switch element, comprising a first end, a second end and a switch control end, the first end coupled to a first end of the first filter, the switch control end coupled to the center frequency control end, the second end coupled to the input end;

a second switch element, comprising a first end, a second end and a switch control end, the first end coupled to a second end of the first filter, the switch control end coupled to the center frequency control end, the second end coupled to the input end;

a third switch element, comprising a first end, a second end and a control switch end, the first end coupled to the first end of the first filter, the switch control end coupled to the center frequency control end, the second end coupled to the output end; and a fourth switch element, comprising a first end, a second end and a switch control end, the first end coupled to the second end of the first filter, the switch control end coupled to the center frequency control end, the second end coupled to the output end.

4. The filtering system according to claim 1, further comprising:

a second filtering module, comprising:

a second frequency translating device, comprising a center frequency control end and an input end, the center frequency control end configured to receive a second control signal, the input end configured to receive the first filtered input signal and being coupled to a circuit having equivalent impedance, the second frequency translating device configured to perform the first frequency translation in collaboration with the first frequency translating device on the input signal by utilizing a second control frequency of the second control signal as a center frequency; and a second filter, configured to perform the first filtering in collaboration with the first filter on the input signal according to the equivalent impedance, and to generate in collaboration with the first frequency translating device, the second frequency translating device and the first filter a second filtered input signal as the first filtered input signal at the output end of the filtering system;

wherein, the first frequency translating device, the second frequency translating device, the first filter and the second filter operate simultaneously to generate the second filtered input signal.

5. The filtering system according to claim 1, further comprising:

a second filtering module, comprising:

a second frequency translating device, comprising a center frequency control end and an input end, the center frequency control end configured to receive a second control signal, the input end configured to receive the first filtered input signal and being coupled to a circuit having equivalent impedance, the second frequency translating device configured to perform a second frequency translation on the input signal by utilizing a second control frequency of the second control signal as a center frequency; and a second filter, configured to perform a second filtering on the input signal according to the equivalent impedance, and to generate in collaboration with the second frequency translating device a second filtered input signal at the output end of the filtering system.

6. The filtering system according to claim 5, further comprising:

a first buffer, coupled to the output end of the first filtering module; and a second buffer, coupled to the output end of the second filtering module.

7. A TV signal receiver, comprising:

a filtering system, comprising:

an output end; and a first filtering module, comprising:

a first frequency translating device, comprising a center frequency control end and an input end, the center frequency control end configured to receive a first control signal, the input end configured to receive a TV signal and being coupled to a circuit having equivalent impedance, the first frequency translating device configured to perform a first frequency translation on the TV signal by utilizing a first control frequency of the first control signal as a center frequency; and a first filter, configured to perform a first filtering on the TV signal according to the equivalent impedance, and to generate in collaboration with the first frequency translating device a first filtered TV signal at the output end of the filtering system, wherein the equivalent impedance determines a bandwidth of the first filtered TV signal;

an analog-to-digital converter (ADC), configured to digitalize the first filtered TV signal to generate a digital filtered TV signal; and a digital front-end processor, configured to process the digital filtered TV signal.

8. The TV signal receiver according to claim 7, wherein the TV signal is an intermediate frequency (IF) signal, the TV signal receiver further comprising:

a phase-locked loop (PLL), configured to provide the control signal; and a mixer, configured to convert a radio frequency (RF) TV signal to the TV signal.

9. The TV signal receiver according to claim 7, further comprising:

a mixer, configured to convert an RF TV signal to the TV signal according to a local oscillation signal;

an RF amplifier, configured to amplify the RF TV signal and to output the amplified RF TV signal to the mixer;

a PLL, configured to provide the local oscillation signal;

a second filtering module, comprising:

a second frequency translating device, comprising a center frequency control end and an input end, the center frequency control end configured to receive a second control signal, the input end configured to receive the filtered TV signal and being coupled to a circuit having equivalent impedance, the second frequency translating device configured to perform the first frequency translation in collaboration with the first frequency translating device on the TV signal by utilizing a second control frequency of the second control signal as a center frequency; and a second filter, configured to perform the first filtering in collaboration with the first filter on the TV signal according to the equivalent impedance, and to generate in collaboration with the first frequency translating device, the second frequency translating device and the first filter a second filtered TV signal as the first filtered TV signal at the output end of the filtering system; wherein, the first frequency translating device, the second frequency translating device, the first filter and the second filter operate simultaneously, the equivalent impedance determines a bandwidth of the second filtered TV signal, and the ADC generates the digital filtered TV signal according to the second filtered TV signal; and an IF amplifier, located between the second filtering module and the ADC.

10. The TV signal receiver according to claim 7, further comprising:
   a mixer, configured to convert an RF TV signal to the TV signal according to a local oscillation signal;
   an RF amplifier, configured to amplify the RF TV signal and to output the amplified RF TV signal to the mixer;
   a PLL, configured to provide the local oscillation signal;
   a second filtering module, comprising:
      a second frequency translating device, comprising a center frequency control end and an input end, the center frequency control end configured to receive a second control signal, the input end configured to receive the TV signal and being coupled to a circuit having equivalent impedance, the second frequency translating device configured to perform a second frequency translation on the TV signal by utilizing a second control frequency of the second control signal as a center frequency; and
      a second filter, configured to perform a second filtering on the TV signal according to the equivalent impedance, and to generate in collaboration with the second frequency translating device a second filtered TV signal at an output end of the second filtering module; wherein, the equivalent impedance determines a bandwidth of the second filtered TV signal;
   an adder, configured to generate a summed filtered TV signal according to the first filtered TV signal and the second filtered TV signal, wherein the ADC generates the digital filtered TV signal according to the summed filtered TV signal; and
   at least one IF amplifier, located preceding to the second filtering module and the first filtering module.

11. The TV signal receiver according to claim 10, further comprising:
   a first buffer, coupled to the output end of the first filtering module; and
   a second buffer, coupled to the output end of the second filtering module.

12. The TV signal receiver according to claim 7, wherein the first filter is a high-pass filter or a low-pass filter.

13. The TV signal receiver according to claim 7, wherein the first frequency translating device comprises:
   a first switch element, comprising a first end, a second end and a switch control end, the first end coupled to a first end of the first filter, the switch control end coupled to the center frequency control end, the second end coupled to the input end;
   a second switch element, comprising a first end, a second end and a switch control end, the first end coupled to a second end of the first filter, the switch control end coupled to the center frequency control end, the second end coupled to the input end;
   a third switch element, comprising a first end, a second end and a control switch end, the first end coupled to the first end of the first filter, the switch control end coupled to the center frequency control end, the second end coupled to the output end; and
   a fourth switch element, comprising a first end, a second end and a switch control end, the first end coupled to the second end of the first filter, the switch control end coupled to the center frequency control end, the second end coupled to the output end.

14. A filtering method, applied to a filtering system, the filtering system comprising an input end and an output end, the input end coupled to a circuit having equivalent impedance; the filtering method comprising:
   receiving an input signal by the input end;
   performing a first translation on the input signal by a first frequency translating device by utilizing a first control frequency of a first control signal as a center frequency; and
   performing a first filtering on the input signal according to the equivalent impedance by a first filter to generate in collaboration with the first frequency translation a first filtered input signal at the output end of the filtering system, wherein the equivalent impedance determines a bandwidth of the first filtered input signal.

15. The filtering method according to claim 14, wherein the first filtering is a high-pass filtering or a low-pass filtering.

16. The filtering method according to claim 14, further comprising:
   performing the first frequency translation on the input signal in collaboration with the first frequency translating device by a second frequency translating device by utilizing a second control frequency of a second control signal as a center frequency; and
   performing the first filtering on the input signal in collaboration with the first filter according to the equivalent impedance by a second filter to generate, in collaboration with the first frequency translating device, the second frequency translating device and the first filter, a second filtered input signal as the first filtered input signal at the output end of the filtering system;
   wherein, the first frequency translating device, the second frequency translating device, the first filter and the second filter operate simultaneously.

17. The filtering method according to claim 14, further comprising:
   performing a second frequency translation on the input signal by a second frequency translating device by utilizing a second control frequency of a second control signal as a center frequency; and
   performing a second filtering on the input signal according to the equivalent impedance by a second filter to generate in collaboration the second frequency translation a second filtered input signal at the output end of the filtering system.

18. A TV signal receiving method, applied to a TV signal receiver comprising a filtering system, the filtering system comprising an input end and an output end, the input end coupled to a circuit having equivalent impedance; the TV signal receiving method comprising:
   receiving a TV signal by the input end;
   performing a first translation on the TV signal by a first frequency translating device by utilizing a first control frequency of a first control signal as a center frequency;
   performing a first filtering on the TV signal according to the equivalent impedance by a first filter to generate in collaboration with the first frequency translation a first filtered TV signal at an output end of the filtering system, wherein the equivalent impedance determines a bandwidth of the first filtered TV signal;
   digitalizing the first filtered TV signal to generate a digital filtered TV signal; and
   processing the digital filtered TV signal by a digital front-end processor.

19. The TV signal receiving method according to claim 18, wherein the TV signal is an IF signal, the TV signal receiving method further comprising:

converting an RF signal to the TV signal according to the control signal.

20. The TV signal receiving method according to claim 18, wherein the first filtering is a high-pass filtering or a low-pass filtering.

21. The TV signal receiving method according to claim 18, further comprising:
performing the first frequency translation on the TV signal in collaboration with the first frequency translating device by a second frequency translating device by utilizing a second control frequency of a second control signal as a center frequency; and
performing the first filtering on the TV signal in collaboration with the first filter according to the equivalent impedance by a second filter to generate, in collaboration with the first frequency translating device, the second frequency translating device and the first filter, a second filtered TV signal as the first filtered TV signal at the output end of the filtering system;
wherein, the first frequency translating device, the second frequency translating device, the first filter and the second filter operate simultaneously.

22. The TV signal receiving method according to claim 18, further comprising:
performing a second frequency translation on the TV signal by a second frequency translating device by utilizing a second control frequency of a second control signal as a center frequency; and
performing a second filtering on the TV signal according to the equivalent impedance by a second filter to generate in collaboration the second frequency translation a second filtered TV signal at the output end of the filtering system.

* * * * *